(12) United States Patent
Yang et al.

(10) Patent No.: US 12,266,798 B2
(45) Date of Patent: Apr. 1, 2025

(54) NEGATIVE ELECTRODE PLATE, A METHOD FOR MANUFACTURING THEREOF, AND A LITHIUM BATTERY

(71) Applicant: SVOLT ENERGY TECHNOLOGY CO., LTD., Jiangsu (CN)

(72) Inventors: Kai Yang, Changzhou (CN); Jing Liu, Changzhou (CN); Shuaibin Lou, Changzhou (CN); Hongxin Yang, Changzhou (CN)

(73) Assignee: SVOLT ENERGY TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 18/724,930

(22) PCT Filed: Jul. 20, 2022

(86) PCT No.: PCT/CN2022/106744
§ 371 (c)(1),
(2) Date: Jun. 27, 2024

(87) PCT Pub. No.: WO2023/165070
PCT Pub. Date: Sep. 7, 2023

(65) Prior Publication Data
US 2024/0421307 A1 Dec. 19, 2024

(30) Foreign Application Priority Data
Mar. 2, 2022 (CN) .......................... 202210199929.6

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0435* (2013.01); *H01M 4/0471* (2013.01);
(Continued)

(58) Field of Classification Search
None
See application file for complete search history.

(56) References Cited

U.S. PATENT DOCUMENTS 6,001,139 A    12/1999  Asanuma et al.
10,505,182 B2 * 12/2019  Zhong .................. H01M 4/139
(Continued)

FOREIGN PATENT DOCUMENTS

CN         1177417 A     3/1998
CN       102544578 A     7/2012
(Continued)

OTHER PUBLICATIONS

Chinese Office action dated Jul. 4, 2023 as received in application No. 202210199929.6.
(Continued)

*Primary Examiner* — Tracy M Dove
(74) *Attorney, Agent, or Firm* — Maschoff Brennan

(57) ABSTRACT

A negative electrode plate comprising a substrate, which comprises a current collector and negative electrode active material bonded on the current collector; first lithium bands arranged on a front surface of the substrate; second lithium bands arranged on a back surface of the substrate; the first lithium bands and the second lithium bands are mutually staggered; adjacent ones of the first lithium bands are spaced apart and adjacent ones of the second lithium bands are spaced apart, respectively.

8 Claims, 4 Drawing Sheets

(51) Int. Cl.
  *H01M 4/133*    (2010.01)
  *H01M 4/1393*   (2010.01)
  *H01M 4/62*     (2006.01)
  *H01M 10/0525*  (2010.01)
  *H01M 4/02*     (2006.01)

(52) U.S. Cl.
  CPC ......... *H01M 4/133* (2013.01); *H01M 4/1393* (2013.01); *H01M 4/623* (2013.01); *H01M 4/625* (2013.01); *H01M 4/626* (2013.01); *H01M 10/0525* (2013.01); *H01M 2004/027* (2013.01)

(56) References Cited

U.S. PATENT DOCUMENTS

| | | | |
|---|---|---|---|
| 11,515,526 B2 * | 11/2022 | Chae | ............ H01M 4/0404 |
| 2022/0069284 A1 | 3/2022 | Yang et al. | |

FOREIGN PATENT DOCUMENTS

| | | |
|---|---|---|
| CN | 105390298 A | 3/2016 |
| CN | 105513828 A | 4/2016 |
| CN | 105869898 A | 8/2016 |
| CN | 106602133 A | 4/2017 |
| CN | 111384405 A | 7/2020 |
| CN | 113851603 A | 12/2021 |
| CN | 113889600 A | 1/2022 |
| CN | 114551796 A | 5/2022 |
| JP | 2014146475 A | 8/2014 |

OTHER PUBLICATIONS

Chinese Office action dated Dec. 29, 2023 as received in application No. 202210199929.6.

* cited by examiner

NEGATIVE ELECTRODE PLATE, A METHOD FOR MANUFACTURING THEREOF, AND A LITHIUM BATTERY

CROSS-REFERENCE TO RELATED APPLICATION

The present application claims priority of Chinese patent application No. 202210199929.6, filed to the CNIPA on Mar. 2, 2022 and entitled "A negative electrode, a manufacturing method thereof, and a lithium battery", which is incorporated herein by reference in its entirety.

TECHNICAL FIELD

The present application relates to the technical field of lithium batteries, and specifically relates to a negative electrode plate, a method for manufacturing thereof, and a lithium battery.

BACKGROUND

With the gradual advancement of sustainable development strategy, the national government attaches more and more importance to the development of new energy. Lithium-ion batteries, currently as the mainstream development direction of vehicle onboard power batteries, have entered a high level of development. With the current status of various vehicle onboard environments, the performance requirements for lithium batteries themselves are becoming higher and higher, such as, better fast charging lithium batteries are demanded for the car-rental operation industry, lithium batteries with more endurance power are demanded for the tourism industry, and for usage by many families, the demand for lithium batteries with longer cyclic life is becoming more and more notable. Based on the current situation, it is extremely important to develop a method to prolong the cyclic life of lithium batteries.

The cyclic life of lithium batteries can be improved by replenishing lithium to the negative electrode of a lithium battery. At present, the methods of replenishing lithium for lithium batteries include, but are not limited to, coating a lithium layer on the electrode material or comprehensively replenishing lithium to an electrode plate, these methods have a relatively low lithium replenishment rate and a relatively complex manufacturing process, and while a large amount of lithium is consumed, a large part of the lithium replenishment cannot be effectively utilized, resulting in the waste of lithium resources. Therefore, it is necessary to develop a negative electrode plate, a manufacturing method thereof and a lithium battery, which can reduce the amount of lithium consumption while ensuring the improvement of the long-term cyclic performance of the lithium battery.

SUMMARY

Therefore, the technical problem to be solved by the present application is how to overcome the deficiencies of wasting lithium resources of lithium replenishment and low efficiency of lithium replenishment in the prior art, so as to provide a negative electrode plate, a method for manufacturing thereof, and a lithium battery.

For this purpose, the present application provides a negative electrode plate comprising:

a substrate, which comprises a current collector and negative electrode active material bonded on the current collector;

first lithium bands arranged on a front surface of the substrate;

second lithium bands arranged on a back surface of the substrate;

the first lithium bands and the second lithium bands are mutually staggered; adjacent ones of the first lithium bands are spaced apart and adjacent ones of the second lithium bands are spaced apart, respectively.

The word "staggered" may refer to completely staggered or partially staggered, but does not include a situation of completely aligned. The situation of "completely staggered" refers to that, at the position of a first lithium band, there is no second lithium band bonded on the back surface of the substrate, which means a first lithium band aligns with an interval region between two second lithium bands, as shown in FIG. 1. The situation of "partially staggered" refers to that a first lithium band and a second lithium band are partially staggered and partially aligned. The situation of "completely aligned" refer to that a first lithium band and a second lithium bands are strictly aligned with each other.

The phrase "spaced apart" refers to that there is an interval spacing between adjacent ones of the first lithium bands, and there is an interval spacing between adjacent ones of the second lithium bands.

Furthermore, the interval $c1$ between two adjacent first lithium bands and the width $b1$ of each first lithium band meet the following relational expression:

$$c1 = 0.4 \times b1 \sim 1.5 \times b1;$$

the interval $c2$ between two adjacent second lithium bands and the width $b2$ of each second lithium band meet the following relational expression:

$$c2 = 0.4 \times b2 \sim 1.5 \times b2.$$

In some optional embodiments, $c1=0.8\times b1 \sim 1.2\times b1$, further optionally, $c1=b1$.

In some optional embodiments, $c2=0.8\times b2 \sim 1.2\times b2$, further optionally, $c2-b2$.

Furthermore, the distance between the midline of one first lithium band and the midline of each of two second lithium bands adjacent thereto are respectively $d1$ and $d2$, $d1=0.5\times d2 \sim 2\times d2$; optionally, $d1=0.8\times d2 \sim 1.25\times d2$, optionally, $d1=d2$, wherein, $d1+d2=b2+c2$.

When $d1=d2$, each first lithium band is aligned with an interval spacing between lithium bands on the back surface of the substrate, and each second lithium band is aligned with an interval spacing of lithium bands on the front surface of the substrate.

Furthermore, the negative electrode active material comprises, by weight, 94-98 parts of carbon material, 0.5-1.5 parts of conductive agent, 1-2 parts of binder, 0.5-1.5 parts of thickener and 0.5-1.5 parts of lithium-containing additive.

The carbon material is selected from at least one of graphite, lithium titanate, mesophase carbon microspheres, silicon-carbon composite material and silicon monoxide; and/or, the conductive agent is selected from at least one of carbon black, carbon nanotube and graphene; the lithium-containing additive is selected from at least one of lithium acetate, lithium thiosulfate, lithium benzoate, lithium alkyl sulfate and lithium cellulose; and/or, the thickener is selected from at least one of sodium carboxymethyl cellulose, hydroxyethyl cellulose and hydroxypropyl methyl cellulose, and/or the binder is selected from at least one of polyvinylidene fluoride, sodium carboxymethyl cellulose, styrene-butadiene rubber, polytetrafluoroethylene, polypropylene, polyacrylonitrile, styrene butadiene rubber and polybutadiene. Wherein, the graphite may be acquired from needle coke, petroleum coke, and etc.

Wherein, the lithium benzoate may be, but not limited to, lithium phenylmethyl, lithium triphenylmethyl, and etc.

The lithium cellulose may be, but not limited to, lithium carboxymethyl cellulose, lithium hydroxyethyl cellulose, and etc.

The present application further provides a method for manufacturing the negative electrode plate, the method comprises the following steps:

arranging the first lithium bands and the second lithium bands on the front surface and the back surface of the substrate, respectively, in such a way that the first lithium bands and the second lithium bands are mutually staggered, adjacent ones of the first lithium bands are spaced apart and adjacent ones of the second lithium bands are spaced apart, respectively, and performing press-fitting to produce a negative electrode plate.

In the present application, the terminology "staggered and spaced apart" refers to that the first lithium bands and the second lithium bands are mutually staggered while adjacent ones of the first lithium bands are spaced apart and adjacent ones of the second lithium bands are spaced apart, respectively.

Optionally, performing a first heating before the step of press-fitting, the first heating comprises standing in a vacuum environment at 42-48° C. for 2-4 h, heating to 62-68° C. and then standing for 3-5 h, heating to 82-88° C. and then standing for 9-11 h;

Optionally, performing a second heating after the step of press-fitting, the second heating comprises standing in a vacuum environment at 82-88° C. for 3-5 h.

Furthermore, the step of press-fitting is carried out by single or multiple rolling, optionally, an interval time of multiple rolling is 1-2 h. The pressure of the rolling may be 0.1-3 Mpa.

The present application further provides a lithium battery comprising the aforementioned negative electrode plate or the negative electrode plate produced by the aforementioned method for manufacturing the negative electrode plate.

The lithium battery further comprises a positive electrode plate, electrolyte solution, and a diaphragm, all of which may use conventional positive electrode plate, electrolyte solution, and diaphragm, in the field of lithium batteries, wherein, the positive electrode plate comprises a current collector and positive electrode active material bonded on the current collector, the positive electrode active material is selected from at least one of lithium iron phosphate, lithium iron manganese phosphate, lithium nickelate manganate material, lithium nickelate material, lithium cobalt-oxide material, lithium nickelate cobalt-oxide material, and lithium nickelate manganate cobalt-oxide material. The combining process may use coating and a cold pressing process in the art. Specifically, the positive electrode active material, conductive agent, and binder are uniformly mixed according to a conventional proportion and added into a solvent to produce a positive electrode paste; the positive electrode paste is uniformly coated on an aluminum foil of the positive electrode current collector, which is dried and cold pressed, and then is die cut and divided into strips to make positive electrode plates. Wherein, the solid content of the positive electrode paste may be 70-75%, the conductive agent may be conventional conductive agent, such as acetylene black, the binder may be conventional binder, such as styrene-butadiene rubber or polyvinylidene fluoride (PVDF), and the solvent may be a conventional organic solvent, such as N-methylpyrrolidone (NMP).

The electrolyte solution of the present application may use lithium-ion electrolyte solution which is commercially available or may be produced by using conventional materials, for example, the electrolyte solution comprises a solvent, a lithium salt, and additives, wherein the solvent is selected from at least one of vinyl carbonate, dimethyl carbonate, and methyl ethyl carbonate; the lithium salt is selected from lithium hexafluorophosphate and/or lithium tetrafluoroborate; the additives are selected from at least one of vinylene carbonate, propylene carbonate, ethylene sulfate and lithium difluorophosphate. The molar concentration of the lithium salt is 0.8-1.5 mol/L, and a mixture of ethylene carbonate (EC), dimethyl carbonate (DEC), and methyl ethyl carbonate (EMC) at a volume ratio of 5-8:1-3:1-3 may be used as the solvent. The volume percentage of the additives may be 0.5-5%. The present application may use a conventional diaphragm, such as a PE diaphragm, a PP diaphragm, a PP/PE composite film, or other commercially available diaphragms.

The technical scheme of the present application has advantages as follows:

1. For the negative electrode plate provided by the present application, it is unexpectedly discovered that, by controlling the first lithium bands and the second lithium bands to be mutually staggered while adjacent ones of the first lithium bands are spaced apart and adjacent ones of the second lithium bands are spaced apart, respectively, the contact angle between each of the lithium bands and the substrate can be changed, thereby greatly improving the diffusion rate of the lithium bands on a contact surface, reducing the consumption amount of lithium bands, so as to effectively reduce waste of lithium resources, guaranteeing that the lithium ions are embedded in the electrode to the maximum extent, and improving the long-term cyclic performance of the lithium battery, and also reducing the electrode plate weight of the electrode itself, thus improving the design space for the entire lithium battery.

2. The negative electrode plate provided by the present application can better improve the diffusion rate of the lithium bands and improve the utilization rate of the lithium bands, thereby improving the long-term cyclic performance of the lithium battery, by controlling $c1=0.4 \times b1 \sim 1.5 \times b1$; $c2=0.4 \times b2 \sim 1.5 \times b2$, further optionally controlling $c1=0.8 \times b1 \sim 1.2 \times b1$ or $c2=0.8 \times b2 \sim 1.2 \times b2$.

3. The negative electrode plate provided by the present application can better improve the diffusion rate of the lithium bands and improve the utilization rate of the lithium bands, thereby improving the long-term cyclic performance of the lithium battery, by controlling $d1=0.5 \times d2 \sim 2 \times d2$, further optionally controlling $d1=0.8 \times d2 \sim 1.25 \times d2$.

4. In the method for manufacturing the negative electrode plate provided by the present application, the first lithium bands and the second lithium bands are arranged on the front surface and the back surface of the substrate, respectively, in such a way that the first lithium bands and the second lithium bands are mutually staggered, adjacent ones of the first lithium bands are spaced apart and adjacent ones of the second lithium bands are spaced apart, respectively, and press-fitting is performed to produce a negative electrode plate, the manufacturing method is simple and effective, and the long-term cyclic performance of the lithium battery can be further improved by means of a first heating before the step of press-fitting and/or a second heating after the step of press-fitting to result in sufficient diffusion of lithium metal.

BRIEF DESCRIPTION OF DRAWINGS

In order to more clearly explain the technical solutions in specific embodiments of the present application or in the prior art, the following is a brief introduction to the drawings needed for describing the specific embodiments or the prior art. Apparently, the drawings described below only represent some embodiments of the present application. For a person skilled in the art, without expenditure of any creative labor, it is possible that other drawings can also be derived from these drawings.

DETAILED DESCRIPTION OF SPECIFIC EMBODIMENTS

The following embodiments are provided for better further understanding of the present application, are not limited to the best embodiments described, and do not constitute any limitation to the content and protection scope of the present application, and any product that is identical or similar to the present application and is obtained by any person under the inspiration teachings of the present application or by combining the present application with other features in prior art falls within the protection scope of the present application.

Where specific experimental procedures or conditions are not specified in embodiments, they may be performed in accordance with operations or conditions of conventional experimental procedures described by literature in the art. If the manufacturer of a reagent or instrument used is not indicated, it is a conventional reagent product or instrument that can be purchased commercially.

Embodiment 1

Figure 1:
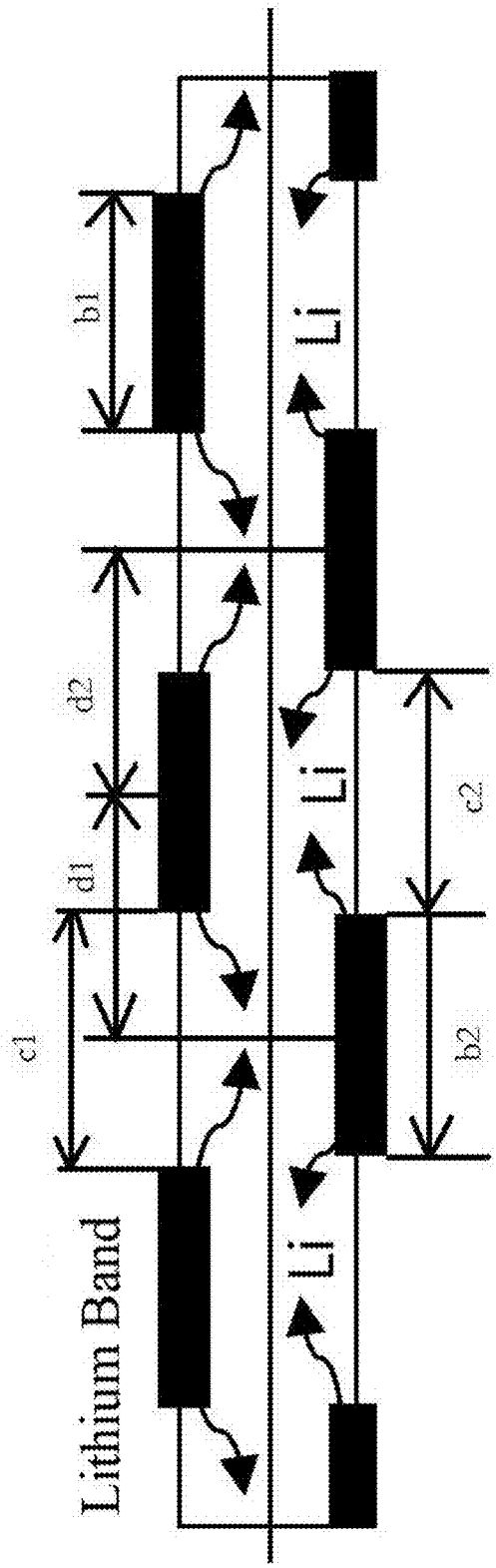
FIG. 1 shows the positional relationship of the first lithium bands and the second lithium bands, in Embodiment 1 of the present application.
Figure 2:
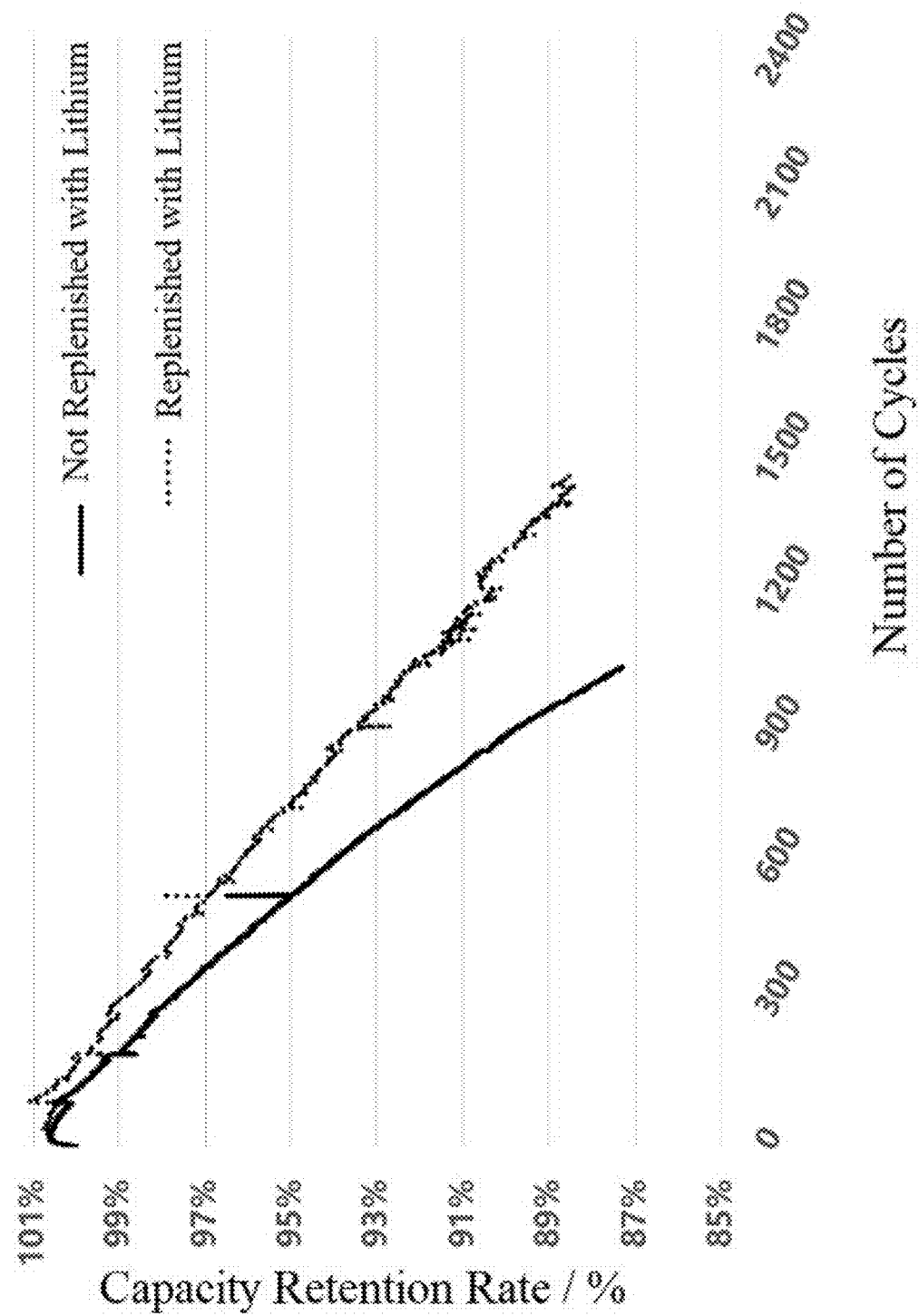
FIG. 2 shows relationship curves between the number of cycles and the capacity retention rate of lithium batteries produced by Embodiment 1 and Comparative Example 1 at the conditions of 1 C/1 C, 25° C. in Experimental Example 1, wherein, the battery is replenished with lithium in Embodiment 1, and the battery is not replenished with lithium in Comparative Example 1.
Figure 3:
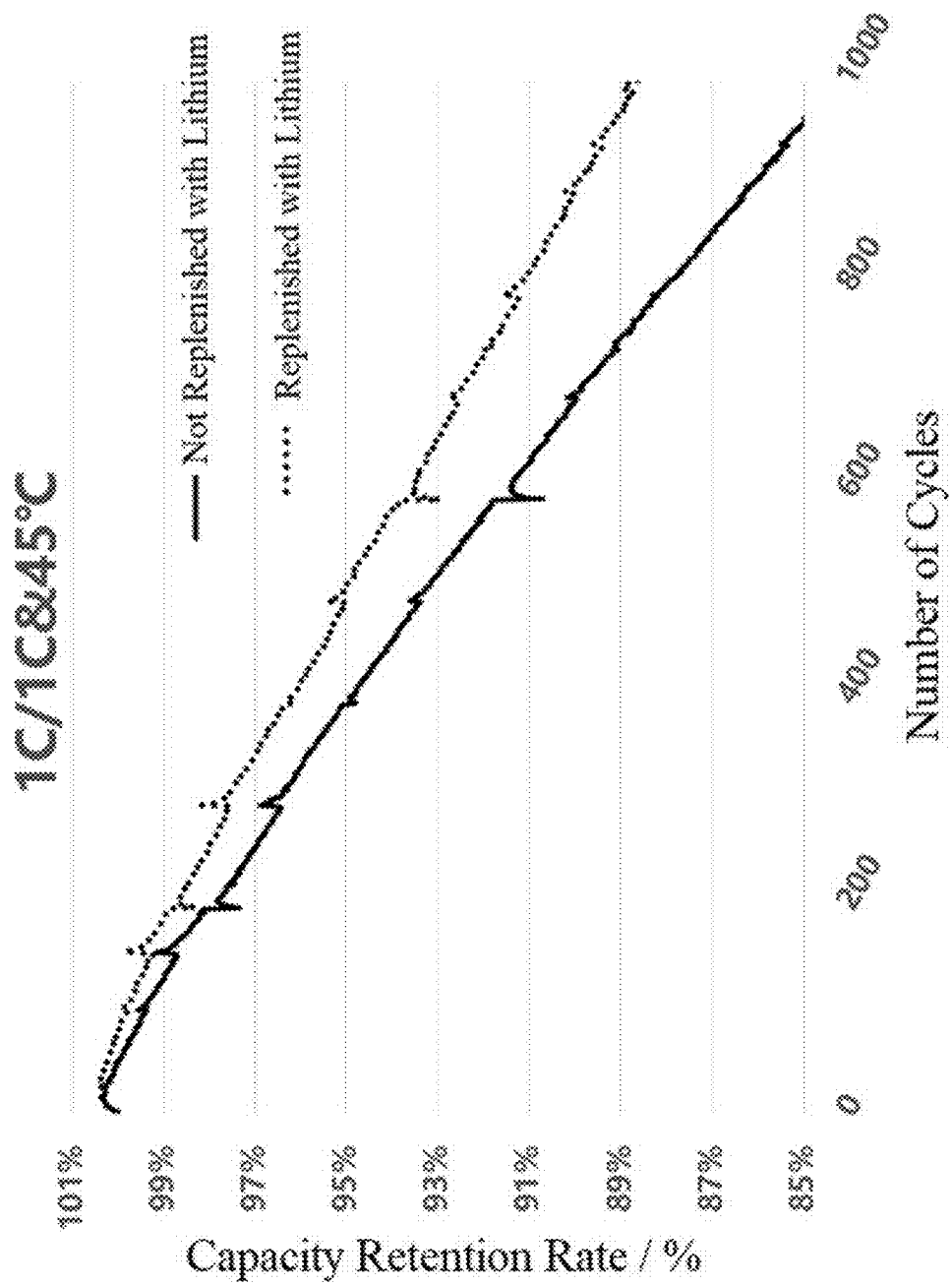
FIG. 3 shows relationship curves between the number of cycles and the capacity retention rate of lithium batteries produced by Embodiment 1 and Comparative Example 1 at the conditions of 0.33 C/1 C, 45° C. in Experimental Example 1, wherein, the battery is replenished with lithium in Embodiment 1, and the battery is not replenished with lithium in Comparative Example 1.

This embodiment provides a negative electrode plate, as shown in FIG. 1, the negative electrode plate comprises a substrate, which comprises a current collector and negative electrode active material bonded on the current collector; the negative electrode plate further comprises first lithium bands arranged on a front surface of the substrate and second lithium bands arranged on a back surface of the substrate; the first lithium bands and the second lithium bands are mutually staggered, adjacent ones of the first lithium bands are spaced apart and adjacent ones of the second lithium bands are spaced apart, respectively. The lengths of each of the first lithium bands, each of the second lithium bands and each substrate are all 100 mm, the width of each of the first lithium bands is b1, the width of each of the second lithium bands is b2, the interval between two adjacent ones of the first lithium bands is c1, the interval between two adjacent ones of the second lithium bands is c2, wherein b1=b2=c1=c2=2.5 mm. The distance from the midline of a first lithium band to the midline of the left adjacent second lithium band thereto is d1, and the distance therefrom to the midline of the right adjacent second lithium band thereto is d2, wherein d1=d2=2.5 mm. The width of each substrate is 55 mm, there are respectively 10 first lithium bands and 10 second lithium bands on each substrate, the thicknesses of both the first lithium bands and the second lithium bands are 40 μm.

A method for manufacturing the above-mentioned negative electrode plate comprises the following steps:

(1) mixing negative electrode active material (graphite), conductive agent (carbon black), thickener (sodium carboxymethyl cellulose (CMC)), binder (styrene-butadiene rubber (SBR)), and lithium replenishment additive (lithium carboxymethyl cellulose) according to a mass ratio of 95.5:1:1.5:1:1 in solvent water for homogenizing, so as to obtain negative electrode paste (solid matter content thereof is 45%), uniformly coating the negative electrode paste on both sides of a copper foil of a current collector at a surface density of 16 mg/cm2 for each single surface, wherein the thickness of the copper foil is 6 μm, drying in an oven at 50° C., and rolling at room temperature to form the substrate;

(2) arranging the lithium bands on the front surface and the back surface of the substrate in accordance with above-mentioned requirements, so as to form ten first lithium bands and ten second lithium bands, after first heating, press-fitting and second heating, a negative electrode plate is produced, wherein the first heating is performed by standing in a vacuum environment at 45° C. for 3 h, heating to 65° C. and then standing for 4 h, heating to 85° C. and then standing for 10 h. The press-fitting is a single rolling at a pressure of 0.3 Mpa. The second heating comprises standing in a vacuum environment at 85° C. for 4 h.

This embodiment further provides a lithium battery, comprising the above-mentioned negative electrode plate, and further comprising a positive electrode plate and electrolyte solution, and a manufacturing method thereof comprises the following steps:

(1) manufacturing the positive electrode plate: Mixing positive electrode active material (LiNiCoMnO2), conductive agent (carbon black), binder (polyvinylidene fluoride (PVDF)) according to a mass ratio of 96:2.8:1.2 in solvent N-methyl-2-pyrrolidone (NMP) for homogenizing, so as to obtain positive electrode mixed paste (solid matter content thereof is 72%), uniformly coating the positive electrode paste on an aluminum foil of a current collector at a surface density of 20 mg/cm2 for each single surface, the thickness of the aluminum foil is 12 μm, and drying in the oven at 90°

C., rolling at room temperature, and cutting to form the positive electrode plate of the lithium-ion battery;

(2) manufacturing the electrolyte solution: mixing ethylene carbonate, dimethyl carbonate and methyl ethyl carbonate according to a volume ratio of 6:2:2 to obtain mixed solvent; adding lithium hexafluorophosphate therein for dissolving, so as to obtain a lithium hexafluorophosphate solution with a concentration of 1.35 mol/L; adding vinylene carbonate at 0.8 vt %, lithium difluorophosphate at 0.65 vt %, ethylene sulfate (DTD) at 0.45 vt %, so as to obtain the electrolyte solution of the lithium-ion battery;

(3) assembling the positive electrode plate, a PE diaphragm (purchased from SEMCORP, model: SV13) and the negative electrode plate in a stacked manner to obtain a battery pack, drying in a vacuum-drying oven, injecting the electrolyte solution, and sealing, so as to obtain the lithium battery.

Embodiment 2

This embodiment provides a negative electrode plate, as shown in FIG. 1, the negative electrode plate comprises a substrate, which comprises a current collector and negative electrode active material bonded on the current collector; the negative electrode plate further comprises first lithium bands arranged on a front surface of the substrate and second lithium bands arranged on a back surface of the substrate; the first lithium bands and the second lithium bands are mutually staggered, adjacent ones of the first lithium bands are spaced apart and adjacent ones of the second lithium bands are spaced apart, respectively. The width of each of the first lithium bands is $b_1$, the width of each of the second lithium bands is $b_2$, the interval between two adjacent ones of the first lithium bands is $c_1$, the interval between two adjacent ones of the second lithium bands is $c_2$, wherein $b_1=b_2=c_1=c_2=2.5$ mm; the distances from the midline of a first lithium band to the midline of each of two second lithium bands adjacent thereto are $d_1$ and $d_2$, respectively, wherein $d_1=d_2=2.5$ mm. The width of the substrate is 55 mm, the lengths of each of the first lithium bands, each of the second lithium bands and each substrate are all 100 mm, there are respectively 10 first lithium bands and 10 second lithium bands on each substrate, the thicknesses of both the first lithium bands and the second lithium bands are 40 μm.

A method for manufacturing the above-mentioned negative electrode plate comprises the following steps:

(1) mixing negative electrode active material (graphite), conductive agent (carbon black), thickener (sodium carboxymethyl cellulose (CMC)), binder (styrene-butadiene rubber (SBR)), and lithium replenishment additive (lithium carboxymethyl cellulose) according to a mass ratio of 95.5:1:1.5:1:1 in solvent water for homogenizing, so as to obtain negative electrode paste (solid matter content thereof is 45%), uniformly coating the negative electrode paste on both sides of a copper foil of a current collector at a surface density of 16 mg/cm2 for each single surface, wherein the thickness of the copper foil is 6 μm, drying in an oven at 50° C., and rolling at room temperature to form the substrate;

(2) arranging the lithium bands on the front surface and the back surface of the substrate in accordance with above-mentioned requirements, so as to form ten first lithium bands and ten second lithium bands, press-fitting to obtain a negative electrode plate. The press-fitting is a single rolling at a pressure of 0.3 Mpa.

This embodiment further provides a lithium battery, comprising the above-mentioned negative electrode plate, and further comprising a positive electrode plate and electrolyte solution, and a manufacturing method thereof comprises the following steps:

(1) manufacturing the positive electrode plate: Mixing lithium positive electrode active material (LiNiCoMnO2), conductive agent (carbon black), binder (polyvinylidene fluoride (PVDF)) according to a mass ratio of 96:2.8:1.2 in solvent N-methyl-2-pyrrolidone (NMP) for homogenizing, so as to obtain positive electrode mixed paste (solid matter content thereof is 72%), uniformly coating the positive electrode paste on an aluminum foil of a current collector at a surface density of 20 mg/cm2 for each single surface, the thickness of the aluminum foil is 12 μm, and drying in the oven at 90° C., rolling at room temperature, and cutting to form the positive electrode plate of the lithium-ion battery;

(2) manufacturing the electrolyte solution: mixing ethylene carbonate, dimethyl carbonate and methyl ethyl carbonate according to a volume ratio of 6:2:2 to obtain mixed solvent; adding lithium hexafluorophosphate therein for dissolving, so as to obtain a lithium hexafluorophosphate solution with a concentration of 1.35 mol/L; adding vinylene carbonate at 0.8 vt %, lithium difluorophosphate at 0.65 vt %, ethylene sulfate (DTD) at 0.45 vt %, so as to obtain the electrolyte solution of the lithium-ion battery;

(3) assembling the positive electrode plate, a PE diaphragm (purchased from SEMCORP, model: SV13) and the negative electrode plate in a stacked manner to obtain a battery pack, drying in a vacuum-drying oven, injecting the electrolyte solution, and sealing, so as to obtain the lithium battery.

Embodiment 3

This embodiment provides a negative electrode plate, as shown in FIG. 1, the negative electrode plate comprises a substrate, which comprises a current collector and negative electrode active material bonded on the current collector; the negative electrode plate further comprises first lithium bands arranged on a front surface of the substrate and second lithium bands arranged on a back surface of the substrate; the first lithium bands and the second lithium bands are mutually staggered, adjacent ones of the first lithium bands are spaced apart and adjacent ones of the second lithium bands are spaced apart, respectively. The width of each of the first lithium bands is $b_1$, the width of each of the second lithium bands is $b_2$, the interval between two adjacent ones of the first lithium bands is $c_1$, the interval between two adjacent ones of the second lithium bands is $c_2$, wherein $b_1=b_2=c_1=c_2=2.5$ mm; the distances from the midline of a first lithium band to the midline of each of two second lithium bands adjacent thereto are $d_1$ and $d_2$, respectively, wherein $d_1=d_2=2.5$ mm. The width of the substrate is 55 mm, the lengths of each of the first lithium bands, each of the second lithium bands and each substrate are all 100 mm, there are respectively 10 first lithium bands and 10 second lithium bands on each substrate, the thicknesses of both the first lithium bands and the second lithium bands are 40 μm.

A method for manufacturing the above-mentioned negative electrode plate comprises the following steps:

(1) mixing negative electrode active material (graphite), conductive agent (carbon black), thickener (sodium carboxymethyl cellulose (CMC)), binder (styrene-butadiene rubber (SBR)), and lithium replenishment additive (lithium carboxymethyl cellulose) according to a mass ratio of 95.5:1:1.5:1:1 in solvent water for homogenizing, so as to obtain negative electrode paste (solid matter content thereof is 45%), uniformly coating the negative electrode paste on both sides of a copper foil of a current collector at a surface density of 16 mg/cm2 for each single surface, wherein the thickness of the copper foil is 6 μm, drying in an oven at 50° C., and rolling at room temperature to form the substrate;

(2) arranging the lithium bands on the front surface and the back surface of the substrate in accordance with above-mentioned requirements, so as to form ten first lithium bands and ten second lithium bands, after heating and press-fitting, a negative electrode plate is produced, wherein, the heating is performed by standing in a vacuum environment at 45° C. for 3 h, heating to 65° C. and then standing for 4 h, heating to 85° C. and then standing for 10 h. The press-fitting is a single rolling at a pressure of 0.3 Mpa.

This embodiment further provides a lithium battery, comprising the above-mentioned negative electrode plate, and further comprising a positive electrode plate and electrolyte solution, and a manufacturing method thereof comprises the following steps:

(1) manufacturing the positive electrode plate: Mixing positive electrode active material (LiNiCoMnO2), conductive agent (carbon black), binder (polyvinylidene fluoride (PVDF)) according to a mass ratio of 96:2.8:1.2, in solvent N-methyl-2-pyrrolidone (NMP) for homogenizing, so as to obtain positive electrode mixed paste (solid matter content thereof is 72%), uniformly coating the positive electrode paste on an aluminum foil of a current collector according to a surface density of 20 mg/cm2 for each single surface, the thickness of the aluminum foil is 12 μm, and drying in the oven at 90° C., rolling at room temperature, and cutting to form the positive electrode plate of the lithium-ion battery; manufacturing the electrolyte solution: mixing ethylene carbonate, dimethyl carbonate and methyl ethyl carbonate according to a volume ratio of 6:2:2 to obtain mixed solvent; adding lithium hexafluorophosphate therein for dissolving, so as to obtain a lithium hexafluorophosphate solution with a concentration of 1.35 mol/L; adding vinylene carbonate at 0.8 vt %, lithium difluorophosphate at 0.65 vt %, ethylene sulfate (DTD) at 0.45 vt %, so as to obtain the electrolyte solution of the lithium-ion battery;

(2) assembling the positive electrode plate, a PE diaphragm (purchased from SEMCORP, model: SV13) and the negative electrode plate in a stacked manner to obtain a battery pack, drying in a vacuum-drying oven, injecting the electrolyte solution, and sealing, so as to obtain the lithium battery.

Embodiment 4

This embodiment provides a negative electrode plate and a manufacturing method thereof, which are basically similar to Embodiment 1, only differing in that, $b_1=b_2=2.5$ mm, $c_1=0.5b_1=1.25$ mm, $c_2=0.5b_2=1.25$ mm.

This embodiment further provides a lithium battery, using the negative electrode plate of this embodiment, the rest of the components and processing thereof are the same as Embodiment 1.

Embodiment 5

This embodiment provides a negative electrode plate and a manufacturing method thereof, which are basically similar to Embodiment 1, only differing in that, $b_1=b_2=2.5$ mm, $c_1=0.8b_1=2$ mm, $c_2=0.8b_2=2$ mm.

This embodiment further provides a lithium battery, using the negative electrode plate of this embodiment, the rest of the components and processing thereof are the same as Embodiment 1.

Embodiment 6

This embodiment provides a negative electrode plate and a manufacturing method thereof, which are basically similar to Embodiment 1, only differing in that, $b_1=b_2=2.5$ mm, $c_1=1.5b_1=3.75$ mm, $c_2=1.5b_2=3.75$ mm, there are respectively 8 first lithium bands and 8 second lithium bands on each substrate, the thicknesses of both the first lithium bands and the second lithium bands are 50 μm.

This embodiment further provides a lithium battery, using the negative electrode plate of this embodiment, the rest of the components and processing thereof are the same as Embodiment 1.

Embodiment 7

This embodiment provides a negative electrode plate and a manufacturing method thereof, which are basically similar to Embodiment 1, only differing in that, $b_1=b_2=2.5$ mm, $c_1=1.2b_1=3$ mm, $c_2=1.2b_2=3$ mm, there are respectively 9 first lithium bands and 9 second lithium bands on each substrate, the thicknesses of both the first lithium bands and the second lithium bands are 45 μm.

This embodiment further provides a lithium battery, using the negative electrode plate of this embodiment, the rest of the components and processing thereof are the same as Embodiment 1.

Embodiment 8

This embodiment provides a negative electrode plate and a manufacturing method thereof, which are basically similar to Embodiment 1, only differing in that, $d_1=0.8 \times d_2$, specifically, $d_1=2.2$ mm, $d_2=2.8$ mm, This embodiment further provides a lithium battery, using the negative electrode plate of this embodiment, the rest of the components and processing thereof are the same as Embodiment 1.

Embodiment 9

This embodiment provides a negative electrode plate and a manufacturing method thereof, which are basically similar to Embodiment 1, only differing in that, $d_1=1.2 \times d_2$, specifically, $d_1=2.7$ mm, $d_2=2.3$ mm, This embodiment further provides a lithium battery, using the negative electrode plate of this embodiment, the rest of the components and processing thereof are the same as Embodiment 1.

Embodiment 10

This embodiment provides a negative electrode plate and a manufacturing method thereof, which are basically similar to Embodiment 1, only differing in that, the raw material ratio for the negative electrode plate is different. In the negative electrode paste of this embodiment, the negative electrode active material (graphite), the conductive agent (carbon black), the thickener (sodium carboxymethyl cellulose (CMC)), the binder (styrene-butadiene rubber (SBR))

and the lithium replenishment additive (lithium carboxymethyl cellulose) are mixed in accordance with a mass ratio of 95.5:1:1.5:1:5.

This embodiment further provides a lithium battery, using the negative electrode plate of this embodiment, the rest of the components processing thereof are the same as Embodiment 1.

Embodiment 11

This embodiment provides a negative electrode plate, as shown in FIG. 1, the negative electrode plate comprises a substrate 3, which comprises a current collector and negative electrode active material bonded on the current collector; the negative electrode plate further comprises first lithium bands 1 arranged on a front surface of the substrate and second lithium bands 2 arranged on a back surface of the substrate; the first lithium bands and the second lithium bands are mutually staggered, adjacent ones of the first lithium bands are spaced apart and adjacent ones of the second lithium bands are spaced apart, respectively. The lengths of each of the first lithium bands, each of the second lithium bands and each substrate are all 100 mm, the width of each of the first lithium bands is b1, the width of each of the second lithium bands is b2, the interval between two adjacent ones of the first lithium bands is c1, the interval between two adjacent ones of the second lithium bands is c2, wherein b1=b2=c1=c2=2.5 mm; the distances from the midline of a first lithium band to the midline of each of two second lithium bands adjacent thereto are d1 and d2, respectively, wherein d1=d2=2.5 mm. The width of each substrate is 55 mm, there are respectively 10 first lithium bands and 10 second lithium bands on each substrate, the thicknesses of both the first lithium bands and the second lithium bands are 40 μm.

A method for manufacturing the above-mentioned negative electrode plate comprises the following steps:

(1) mixing negative electrode active material (graphite), conductive agent (carbon black), thickener (hydroxyethyl cellulose), binder (polytetrafluoroethylene), and lithium replenishment additive (lithium dodecyl sulfate) according to a mass ratio of 95.5:1:1.5:1:1 in solvent water for homogenizing, so as to obtain negative electrode paste (solid matter content thereof is 45%), uniformly coating the negative electrode paste on both sides of a copper foil of a current collector at a surface density of 16 mg/cm2 for each single surface, wherein the thickness of the copper foil is 6 μm, drying in an oven at 50° C., and rolling at room temperature to form the substrate;

(2) arranging the lithium bands on the front surface and the back surface of the substrate in accordance with above-mentioned requirements, so as to form ten first lithium bands and ten second lithium bands, after first heating, press-fitting and second heating, a negative electrode plate is produced, wherein, the first heating is performed by standing in a vacuum environment at 42° C. for 3 h, heating to 68° C. and then standing for 4 h, heating to 82° C. and then standing for 11 h. The press-fitting is a single rolling at a pressure of 0.3 Mpa. The second heating comprises standing in a vacuum environment at 88° C. for 3 h.

This embodiment further provides a lithium battery, comprising the above-mentioned negative electrode plate, and further comprising a positive electrode plate and electrolyte solution, and a manufacturing method thereof comprises the following steps:

(1) manufacturing the positive electrode plate: Mixing positive electrode active material (LiFePO4), conductive agent (acetylene black), binder (polyvinylidene fluoride (PVDF)) according to a mass ratio of 96:2.8:1.2 in solvent N-methyl-2-pyrrolidone (NMP) for homogenizing, so as to obtain positive electrode mixed paste (solid matter content thereof is 72%), uniformly coating the positive electrode paste on an aluminum foil of a current collector at a surface density of 20 mg/cm2 for each single surface, the thickness of the aluminum foil is 12 μm, and drying in the oven at 90° C., rolling at room temperature, and cutting to form the positive electrode plate of the lithium-ion battery;

(2) manufacturing the electrolyte solution: mixing ethylene carbonate, dimethyl carbonate and methyl ethyl carbonate according to a volume ratio of 6:2:2 to obtain mixed solvent; adding lithium hexafluorophosphate therein for dissolving, so as to obtain a lithium hexafluorophosphate solution with a concentration of 1.35 mol/L; adding vinylene carbonate at 0.8 vt %, lithium difluorophosphate at 0.65 vt %, ethylene sulfate (DTD) at 0.45 vt %, so as to obtain the electrolyte solution of the lithium-ion battery;

(3) assembling the positive electrode plate, a PE diaphragm (purchased from SEMCORP, model: SV13) and the negative electrode plate in a stacked manner to obtain a battery pack, drying in a vacuum-drying oven, injecting the electrolyte solution, and sealing, so as to obtain the lithium battery.

Comparative Example 1

This comparative example provides a negative electrode plate which differs from Embodiment 1 only in the absence of lithium bands, the negative electrode plate comprises a substrate that comprises a current collector and negative electrode active material bonded on the current collector; a manufacturing method thereof is performed by mixing negative electrode active material (graphite), conductive agent (carbon black), thickener (sodium carboxymethyl cellulose (CMC)), binder (styrene-butadiene rubber (SBR)), and lithium replenishment additive (lithium carboxymethyl cellulose) according to a mass ratio of 95.5:1:1.5:1:1 in solvent water for homogenizing, so as to obtain negative electrode paste (solid matter content thereof is 45%), uniformly coating the negative electrode paste on both sides of a copper foil of a current collector at a surface density of 16 mg/cm2 for each single surface, and the thickness of the copper foil is 6 μm, drying in an oven at 50° C., and rolling at room temperature to form the substrate;

This comparative example further provides a lithium battery, using the negative electrode plate of this comparative example, the rest of the components and processing thereof are the same as Embodiment 1.

Comparative Example 2

This comparative example provides a negative electrode plate and a manufacturing method thereof, which are basically similar to Embodiment 1, only differing in that, c1=c2=0, the lithium bands completely cover both a front surface and a back surface of a substrate, the width of the substrate is 55 mm, the front surface and the back surface each has 22 lithium bands, respectively.

This comparative example further provides a lithium battery, using the negative electrode plate of this comparative example, the rest of the components and processing thereof are the same as Embodiment 2.

Comparative Example 3

This comparative example provides a negative electrode plate and a manufacturing method thereof, which are basically similar to Embodiment 1, only differing in that, every one of the first lithium bands and every one of the second lithium bands are aligned with each other, adjacent ones of the first lithium bands are spaced apart and adjacent ones of the second lithium bands are spaced apart, respectively, b1=b2=c1=c2=2.5 mm; d1=d2=5 mm; the width of the substrate is 55 mm, there are respectively 10 first lithium bands and 10 second lithium bands on each substrate, the thicknesses of both the first lithium bands and the second lithium bands are 40 μm.

This comparative example further provides a lithium battery, using the negative electrode plate of this comparative example, the rest of the components and processing thereof are the same as Embodiment 2.

Comparative Example 4

This comparative example provides a negative electrode plate and a manufacturing method thereof, which are basically similar to Embodiment 1, only differing in that, c1=c2=0, the lithium bands completely cover both a front surface and a back surface of a substrate, the width of the substrate is 55 mm, the front surface and the back surface each has 22 lithium bands, respectively, and the thicknesses of both the first lithium bands and the second lithium bands are 20 μm.

This comparative example further provides a lithium battery, using the negative electrode plate of this comparative example, the rest of the components and processing thereof are the same as Embodiment 2.

Experimental Example 1

Testing the electrochemical performance of lithium batteries produced by the respective embodiments and comparative examples by using Wuhan LAND electrical test system and Princeton electrochemical workstation. At 25° C., the charging ratio and the discharging ratio are both 1 C, the capacity retention rate (%) after 1000 cycles is tested, within a charging and discharging voltage range of 2.5-4.3V; and at 45° C., the charging rate is 0.33 C, the discharging rate is 1 C, the capacity retention rate (%) after 1000 cycles is tested, within a charging and discharging voltage range of 2.5-4.3V, the test results are shown in the following table.

TABLE 1 cyclic performance test results of lithium batteries

|  | The capacity retention rate (%) after 1000 cycles, at 25° C. and 1 C/1 C, | The capacity retention rate (%) after 1000 cycles, at 45° C. and 0.33/1 C, |
| --- | --- | --- |
| Embodiment 1 | 92.9% | 90.7% |
| Embodiment 2 | 91.9% | 90.1% |
| Embodiment 3 | 92.0% | 90.1% |
| Embodiment 4 | 92.8% | 90.1% |
| Embodiment 5 | 92.8% | 90.6% |
| Embodiment 6 | 92.1% | 90.4% |
| Embodiment 7 | 92.2% | 90.5% |
| Embodiment 8 | 92.7% | 90.5% |
| Embodiment 10 | 92.8% | 90.6% |
| Embodiment 11 | 92.3% | 89.9% |
| Comparative Example 1 | 86.2% | 82.3% |
| Comparative Example 2 | 92.8% | 90.6% |
| Comparative Example 3 | 88.4% | 85.0% |
| Comparative Example 4 | 88.0% | 84.3% |

It can be known from the above test results that, for the respective embodiments in comparison with Comparative Example 1, it is indicated that, the cyclic capacity retention rate can be improved by lithium replenishment, thereby improving the long-term cyclic performance; the capacity retention rates of the respective embodiments are basically equal to that of Comparative Example 2, while the consumption amounts of lithium bands of the respective embodiments are significantly lower than that of Comparative Example 2 (reduction rate is 30-55%); the capacity retention rates of the respective embodiments are improved in comparison with Comparative Example 3, so it is indicated that applying lithium replenishment in a mutually staggered way can effectively improve the diffusion effect of lithium ions, so as to dispersedly embed lithium therein to the maximum extent; for the respective embodiments in comparison with Comparative Example 4, the consumption amounts of lithium bands are basically the same, but the capacity retention rates are significantly improved; for Embodiment 1 in comparison with Embodiment 2 and Embodiment 3, heating after lithium replenishment helps to improve the cyclic retention rate, this is because the increase in temperature is conducive to the diffusion of lithium ions in the substrate, thereby improving the lithium replenishment efficiency.

Experimental Example 2

The Relationship of Influence on Lithium Metal Diffusion by Different Combinations of Temperatures and Durations:

The substrate before lithium replenishment is weighed and cut into 10 cm sample segments for weighing, the average weight of 20 sample segments with an error value ≤5% is taken as a reference mass T1 before lithium replenishment. A produced lithium-replenished substrate (produced in accordance with step (1) of the method for manufacturing the negative electrode plate in Embodiment 1) is cut into 10 cm sample segments, the non-embedded lithium bands on the surface are cleaned off in a vacuum glove box, and the average weight T2 of 20 sample segments with an error value≤5% is taken after weighing, and the lithium metal diffused mass t=T2−T1.

Figure 4:
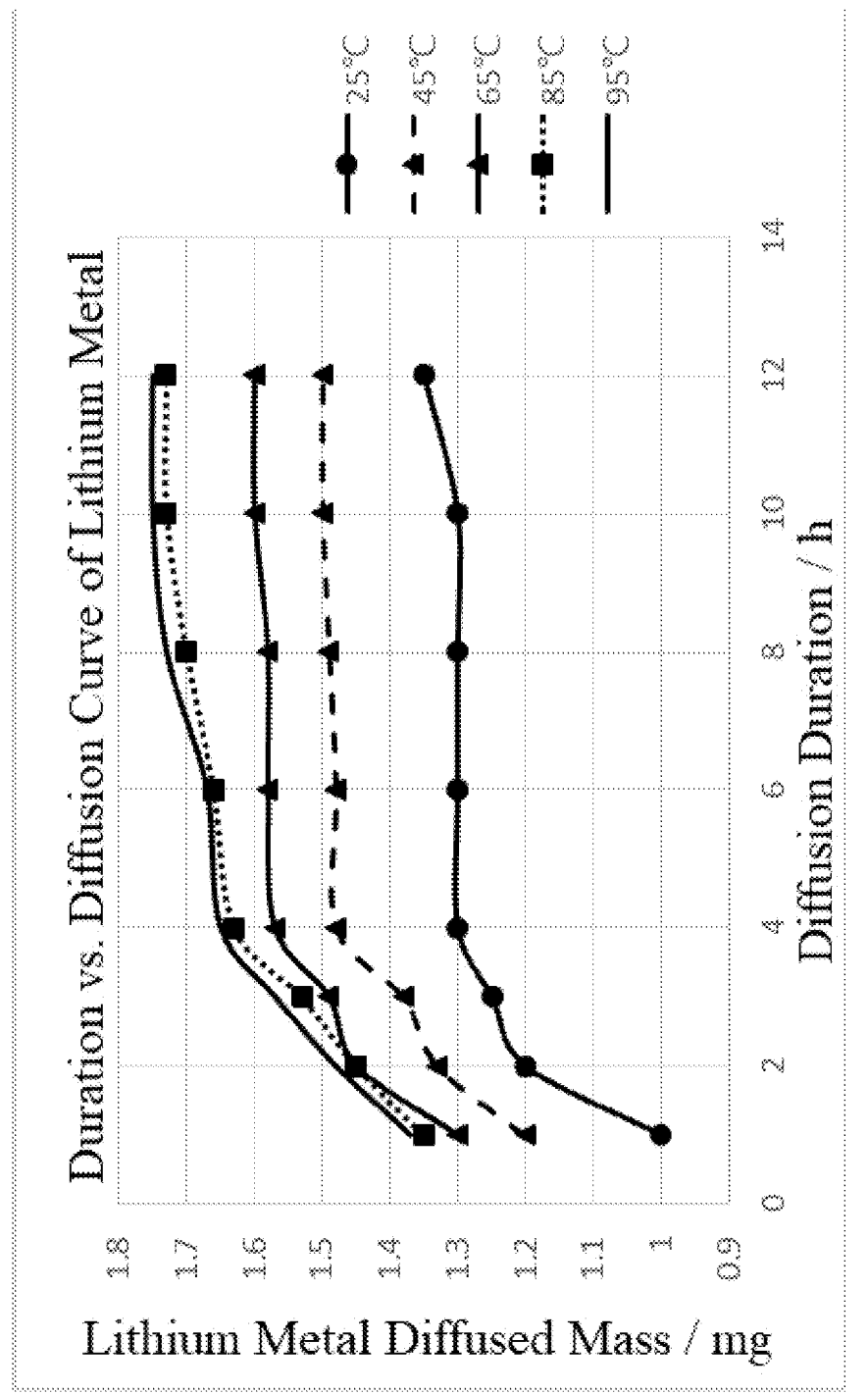
FIG. 4 shows diffusion curves of lithium metal at various temperatures in Experimental Example 2.

Selecting diffusion durations of 1 h, 2 h, 3 h, 4 h, 6 h, 8 h, 10 h, and 12 h, and diffusion temperatures of 25° C., 45° C., 65° C., 85° C., and 95° C. (only an upper limit of 95° C. is reached herein because the baking temperature of negative electrode in a manufacturing process cannot exceed 95° C., otherwise, the molecular structure of the binder would be damaged), the parallel test comparison of the influence by different temperatures and durations on lithium metal diffusion is carried out, and the results are shown in FIG. 4. It can be seen that, the diffusion results are improved with the extension of duration and the increase of temperature. At the temperatures of 25° C., 45° C., and 65° C., the diffused mass basically reaches the maximum value after a diffusion duration of 4-6 h. At 85° C. and 95° C., the diffusion effects are basically the same, both reach the maximum value after a diffusion duration of 10 h. Based on the above results, the effect of lithium replenishment can be improved by means of stepwise temperature rising, that is, standing in a vacuum environment at 42-48° C. for 2-4 h, heating to 62-68° C. and then standing for 3-5 h, and heating to 82-88° C. and then standing for 9-11 h.

Apparently, the embodiments described above are merely examples for clear illustration, and are not intended to limit ways of implementation. For a person with ordinary skill in the art, variations or changes in different forms can be made on the basis of the above description. It is unnecessary and impossible to exhaustively list all the implementation ways herein. Any obvious variations and changes derived therefrom are still within the protection scope of the present application.

The invention claimed is:

1. A negative electrode plate, comprising:
   a substrate, which comprises a current collector and negative electrode active material bonded on the current collector;
   first lithium bands arranged on a front surface of the substrate;
   second lithium bands arranged on a back surface of the substrate; and
   the first lithium bands and the second lithium bands are mutually staggered; adjacent ones of the first lithium bands are spaced apart and adjacent ones of the second lithium bands are spaced apart, respectively; interval c1 between two adjacent first lithium bands and width b1 of each first lithium band meet the following relational expression: c1=b1; interval c2 between two adjacent second lithium bands and width b2 of each second lithium band meet the following relational expression: c2=b2; a distance between the midline of one first lithium band and the midlines of its two adjacent second lithium bands are respectively d1 and d2, d1=d2; the negative electrode active material comprises, by weight, 94-97.5 parts of carbon material, lithium titanate, or silicon monoxide, 0.5-1.5 parts of conductive agent, 1-2 parts of binder, 0.5-1.5 parts of thickener and 0.5-1.5 parts of lithium-containing additive; and the carbon material is selected from at least one of graphite, mesophase carbon microspheres and silicon-carbon composite material.

2. The negative electrode plate according to claim 1, wherein, the conductive agent is at least one selected from the group consisting of carbon black, carbon nanotube and graphene; or,
   the lithium-containing additive is at least one selected from the group consisting of lithium acetate, lithium thiosulfate, lithium benzoate, lithium alkyl sulfate and lithium cellulose; or,
   the thickener is at least one selected from the group consisting of sodium carboxymethyl cellulose, hydroxyethyl cellulose and hydroxypropyl methyl cellulose; or
   the binder is at least one selected from the group consisting of polyvinylidene fluoride, sodium carboxymethyl cellulose, polytetrafluoroethylene, polypropylene, polyacrylonitrile, styrene-butadiene rubber and polybutadiene.

3. A method for manufacturing the negative electrode plate according to claim 1, comprising the following steps:
   arranging the first lithium bands and the second lithium bands on the front surface and the back surface of the substrate, respectively, in such a way that the first lithium bands and the second lithium bands are mutually staggered, adjacent ones of the first lithium bands are spaced apart, and adjacent ones of the second lithium bands are spaced apart, respectively, and performing press-fitting to produce a negative electrode plate.

4. The method according to claim 3, wherein, the step of press-fitting is carried out by single or multiple rolling.

5. A lithium battery, comprising the negative electrode plate according to claim 1.

6. The method according to claim 3, wherein, a first heating is performed before the step of press-fitting, and the first heating comprises standing in a vacuum environment at 42-48° C. for 2-4 h, heating to 62-68° C. and then standing for 3-5 h, heating to 82-88° C. and then standing for 9-11 h.

7. The method according to claim 6, wherein, a second heating is performed after the step of press-fitting, and the second heating comprises standing in a vacuum environment at 82-88° C. for 3-5 h.

8. The method according to claim 4, wherein, an interval time of multiple rolling is 1-2 h.

* * * * *